US005982527A

United States Patent [19]

Beiser

[11] Patent Number: 5,982,527

[45] Date of Patent: Nov. 9, 1999

[54] INERTIAL STABILIZATION OF ROTATIONAL OPTICAL SCANNERS

[76] Inventor: Leo Beiser, 151-77 28th Ave., Flushing, N.Y. 11354

[21] Appl. No.: 09/086,257

[22] Filed: May 28, 1998

Related U.S. Application Data

[60] Provisional application No. 60/047,967, May 28, 1997.

[51] Int. Cl.[6] ........ G02B 26/08

[52] U.S. Cl. ........ 359/216; 359/200; 359/219; 359/226; 359/855

[58] Field of Search ........ 359/196–200, 359/216–219, 224, 833, 846, 848, 850, 855, 226

[56] References Cited

U.S. PATENT DOCUMENTS 3,485,546 12/1969 Roth .
3,619,039 11/1971 Beiser .
3,910,675 10/1975 MacGovern .
5,114,217 5/1992 Beiser .

OTHER PUBLICATIONS

Leo Beiser, "Fundamental Architecture of Optical Scanning Systems", Nov. 1, 1995, vol. 34, No. 31, Applied Optics, pp. 7307–7317.

*Primary Examiner*—James Phan
*Attorney, Agent, or Firm*—Martin M. Novack

[57] ABSTRACT

Method and apparatus are disclosed for stabilizing an optical scanner having a rotational axis and a substrate with facets which are generally pyramidal, the outer diameter of the facets being proximate to a base plane which is generally perpendicular to the axis. The method includes adapting the scanner to reduce the inertial deformation of the facets during high speed rotation of the scanner by shaping the substrate beyond the base plane such that during rotation it is substantially inertially symmetric about the base plane.

10 Claims, 3 Drawing Sheets

INERTIAL STABILIZATION OF ROTATIONAL OPTICAL SCANNERS

RELATED APPLICATION

This application claims priority from U.S. Provisional Patent Application 60/047,967, filed May 28, 1997, and said Provisional Patent Application is incorporated herein by reference.

FIELD OF THE INVENTION

This invention relates to optical scanning equipment and methods, and, more particularly, to the stabilization of rotational optical scanners.

BACKGROUND OF THE INVENTION

A rotational scanner is a mechanical-optical device which, when rotated about its axis, imparts an angular change in an incident optical beam. The scanner is comprised typically of a substrate having reflective optical facets. Of the two generic scanner types, pyramidal or prismatic, the pyramidal ones are the principal subject of this invention. This type is exemplified in U.S. Pat. Nos. 3,619,039 and 5,114,217. Wherein the stationary beam direction is essentially paraxial or radially symmetric with the spin axis, and the changing beam direction is typically near-perpendicular to the axis, and rotating angularly about it by the action of the scanner. In the case of laser beam scanning, the fixed input illuminating beam is usually paraxial (or converging to a point coincident) with the axis, and the redirected beam is rotated about the axis. The pyramidal scanner is identified by its facet surfaces being oriented at an angle to the axis (usually at angles greater than 10°), forming a "pyramidal" set. A detailed description of these factors appears in the journal paper entitled, "Fundamental Architecture of Optical Scanning Systems" by Leo Beiser, in Applied Optics, Vol. 34, No 31, pp 7307–7317 (1 Nov. 1995), in which pyramidal forms are represented in FIGS. 2 and 4, and prismatic ones in FIGS. 3 and 10.

Often, the scanners are operated at such high speeds that the inertial forces developed within the rotating substrate exert sufficient stress to distort the optical surfaces which form the facets. When this effect is apparent, the geometric purity of the optical beam which is redirected by the distorted facet is perturbed, forming optical aberration. Consequently, the quality of a focal spot derived from such a distorted beam is also aberrated, degrading the important optical property known as resolution. It is an object of this invention to provide a means for reducing substantially —and even approaching the elimination of —the degrading effects of inertial deformation, without resorting to the costly use and fabrication of exotic substrate materials, such as beryllium. It is noteworthy that the use of such materials can only reduce the degrading inertial effects by a limited factor, while the method disclosed here provides means for actually balancing the error toward a null.

FIG. 1 shows the consequence of rotating an uncompensated scanner at high speed. Illustrated is a generic pyramidal scanner, section view through its axis 115. For development of the distortion process, rather than being formed of a single solid substrate, assume the scanner is composed of an array of adjacent thin discs 110 whose outer radii terminate on a locus which defines the facet surface. Upon rotation of the array about its axis, centrifugal "g-forces" will develop for each elemental mass m in each disc, in proportion to the relation $\omega^2 r$, where $\omega$ is the rotational angular velocity and r is the local radius of each m. The original flat facet is shown at 102, and the concave distorted facet is shown at 104 (with distortion highly magnified). Assuming, first, that each disc is free to expand radially under this stress, those viewed from the apex (a) toward the base plane (b) will experience progressively greater expansion, in accordance with the increased radii of their mass elements m; each to its own destination, independently of its neighbors.

This simple model is complicated, however, by the real connection between each disc; effectively exerting shear between the discs as each tries to expand to its unique height. Thus, the gradual increase in height is accompanied by a progressive bending of the array "to the left", as the shorter neighbors constrain the greater expansion of the longer discs. The resulting concave deformation of the facet is confirmed in subsequent expression of finite element analysis (FEA) conducted on an actual scanner.

SUMMARY OF THE INVENTION

The stabilization method disclosed here entails the balancing of mass of the scanner to provide substantial inertial body symmetry about a nominal planar surface within the substrate. Since this surface and its inertial balance factor are not directly accessible, a tangible related criterion (for typical substrate material having uniform density) is that of achieving substantial geometric symmetry. In addition to subsequent expression of preferred inertial criteria, this analogous relationship allows delimiting the procedure geometrically. Operational conditions are also presented where limited geometric asymmetry renders substantial inertial symmetry as manifest by the nulling of inertial deformation of the facets.

DETAILED DESCRIPTION

Figure 1:
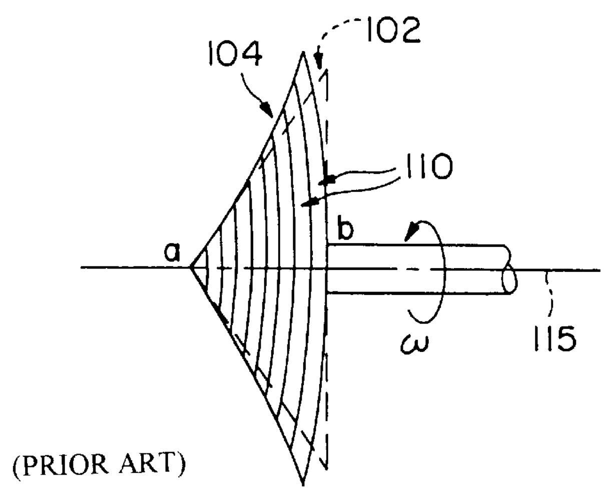
FIG. 1 shows a prior art type of scanner and the type of distortion that can occur.

For the exemplary case illustrated in FIG. 1, mass of complementary contour is added to the substrate to approach geometric symmetry about its base plane (b). As rendered in FIG. 2, this allows complementary forces to develop beyond plane (b) which balance those described earlier. This provides effective nulling of the tendency to develop a concave deformation of an initially flat facet, alleviating the distortion and its consequential optical aberration. The original facet is shown at 205, and the inertially expanded facet is shown at 208. The axis is represented at 215. There remains a minor radial stretch of the substrate, increasing progressively in both directions about surface (b). This can be controlled readily to approach the original (flat) contour. (Note that the illustrated deformation is magnified for clarity; by some 100,000 times.) The actual change of the facet angle is so minute, that it can most often be ignored.

Figure 2:
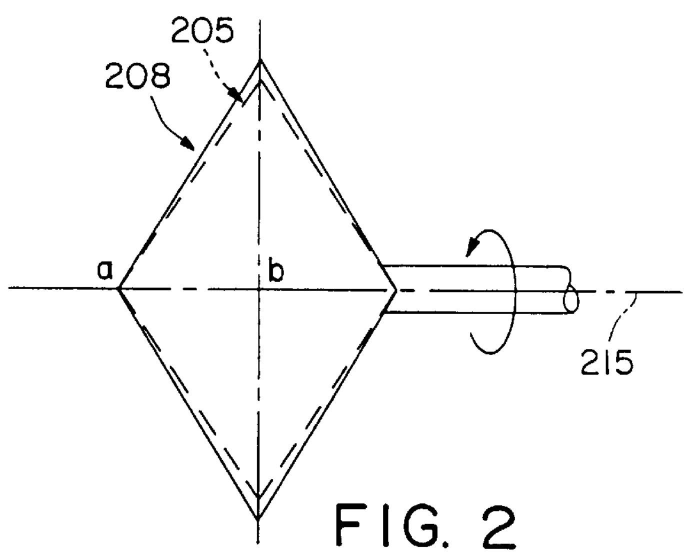
FIG. 2 shows how balancing complementary forces can be used in a FIG. 1 type of structure.
Figure 3:
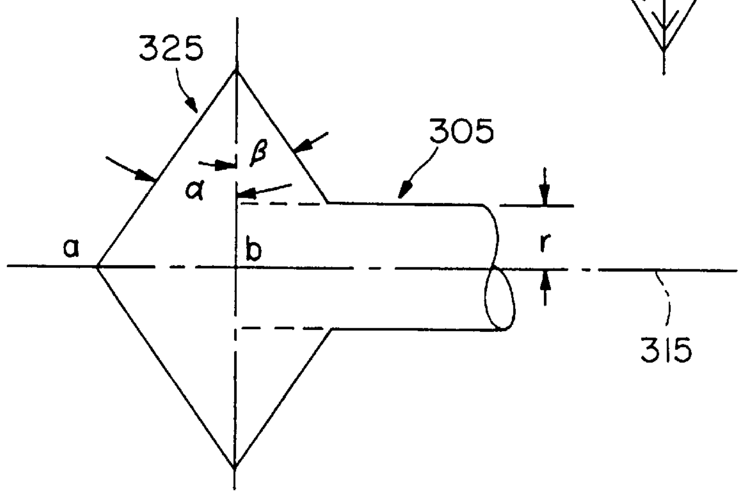
FIG. 3 shows an embodiment of a scanner with inertial compensation.

A more operational high-speed configuration than those of FIGS. 1 and 2 can employ a thicker and more rigid drive shaft. Although this may frustrate application of rigorous geometric symmetry, inertial symmetry can still be approached, utilizing some design flexibility. This condition is illustrated in FIG. 3, where the massive drive shaft 305 on axis 315 may be utilized to contribute to the compensatory process. With the substantive radius r allotted to the drive shaft (which extended originally as dashed lines to the base b), it already renders some restraint on the facet (325) distortion; primarily in its low radius region. Thus, the upper mass represented within the angle β is reduced as compared to the corresponding mass within the angle α; established by making β<α. This nearly complementary mass within β vs. that within αexemplifies geometric asymmetry; just sufficient to form a composite inertial mass distribution which develops the effect similar to that illustrated in FIG. 2.

Figure 4A:
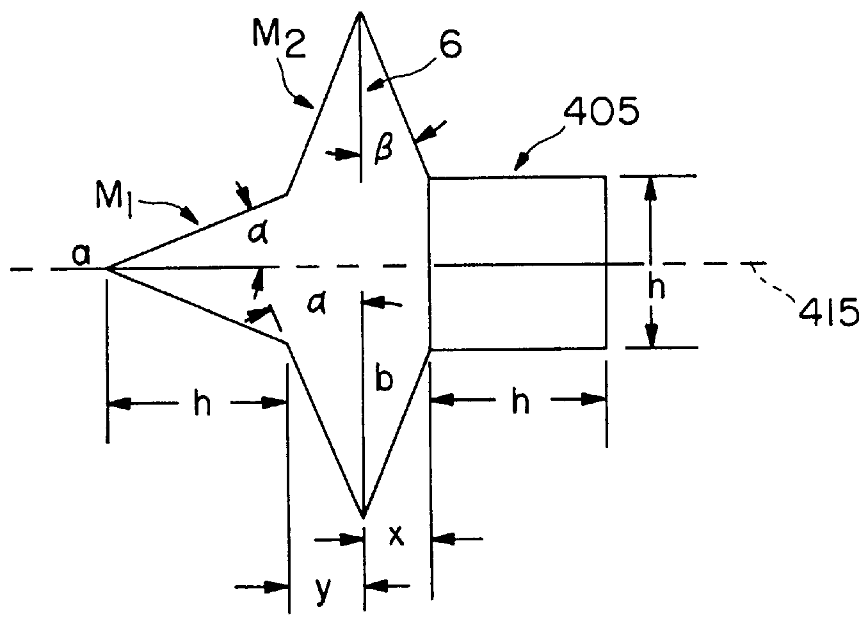
FIG. 4A and 4B show a further embodiment of a scanner with inertial compensation, with FIG. 4A being a side view, and FIG. 4B being a front view.
Figure 4B:
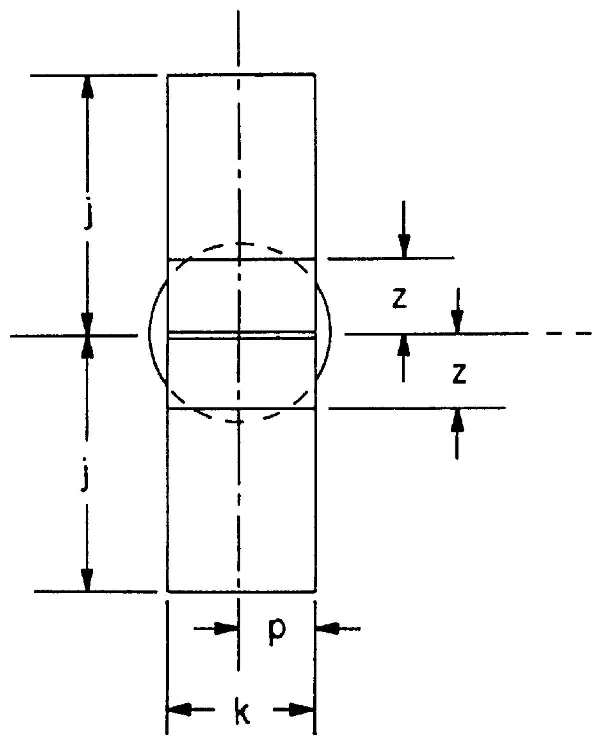

The principles of the above-described method were applied to an actual optical scanner, yielding remarkably effective results. The scanner is of the pyramidal type; that described in the aforementioned U.S. Pat. No. 5,114,217 entitled, "Double Reflection Light Scanner". The form analyzed, illustrated in FIG. 4, is comprised of two sets of two facets; each set positioned symmetrically about the rotating axis. Each pair of facets incorporates mirrors $M_1$ and $M_2$ in a double-reflection arrangement to null the positional error of a scanned beam which can result from minute shaft wobble during rotation. The purpose of the added procedure is to enhance inertial stability: to sustain high beam quality during high speed rotation. This beam quality stabilization process augments the beam position accuracy provided by the aforementioned patent.

FIG. 4 illustrates the concept described above, where a substantive shaft coupling member 405 on axis 415 inhibits the application of perfect geometric symmetry about baseline (b). Instead, the shaft member is utilized to sustain stability of the lower mirror substrates ($M_1$ and the lower part of $M_2$) while the added mass within angle β adds the required inertial balance for mirror $M_2$ . Noting the dimensions at the bottom, where the asymmetry is represented by x<y (for example, 6.5<8.5), this forms angle β which is some 2° smaller than the 22.5° angle of α, as prescribed in the above discussion. Rigorous optimization of B may be obtained with computational finite element analysis (FEA), as was done for this scanner. In an example of the FIG. 4 scanner, h=20, j=28.5, p=8, k=16, and z=8.5.

Figure 5:
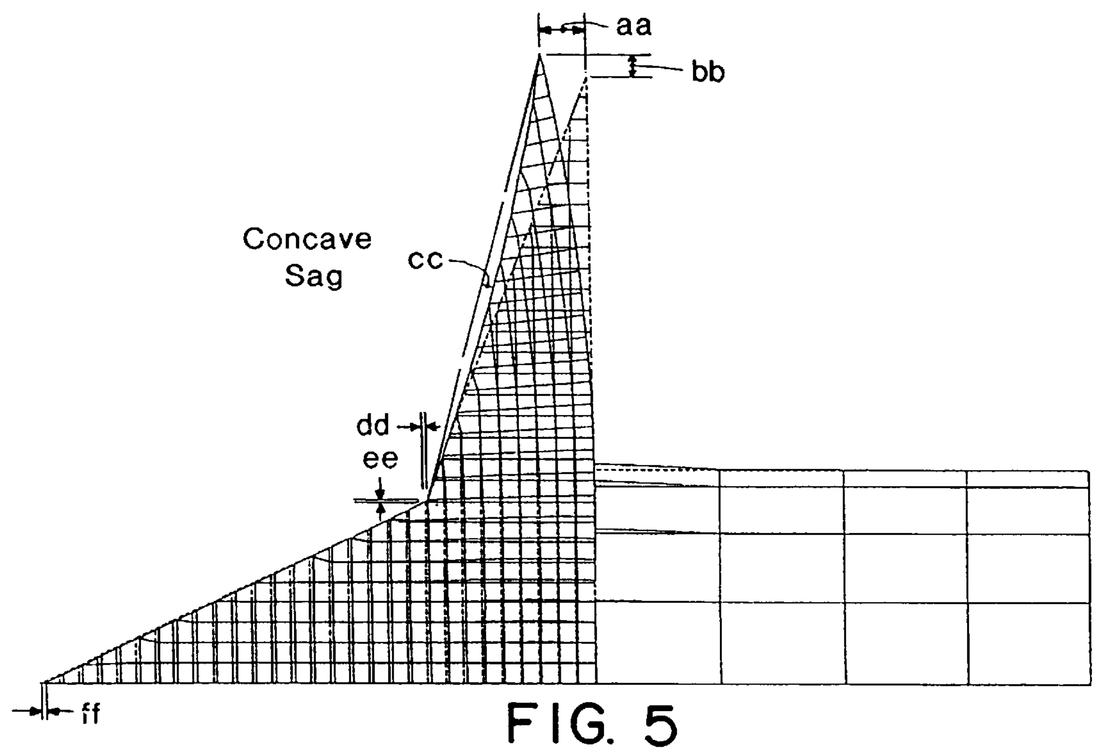
FIGS. 5 and 6 illustrate finite element analysis for an unmodified scanner (FIG. 5) and a stabilized scanner (FIG. 6).
Figure 6:
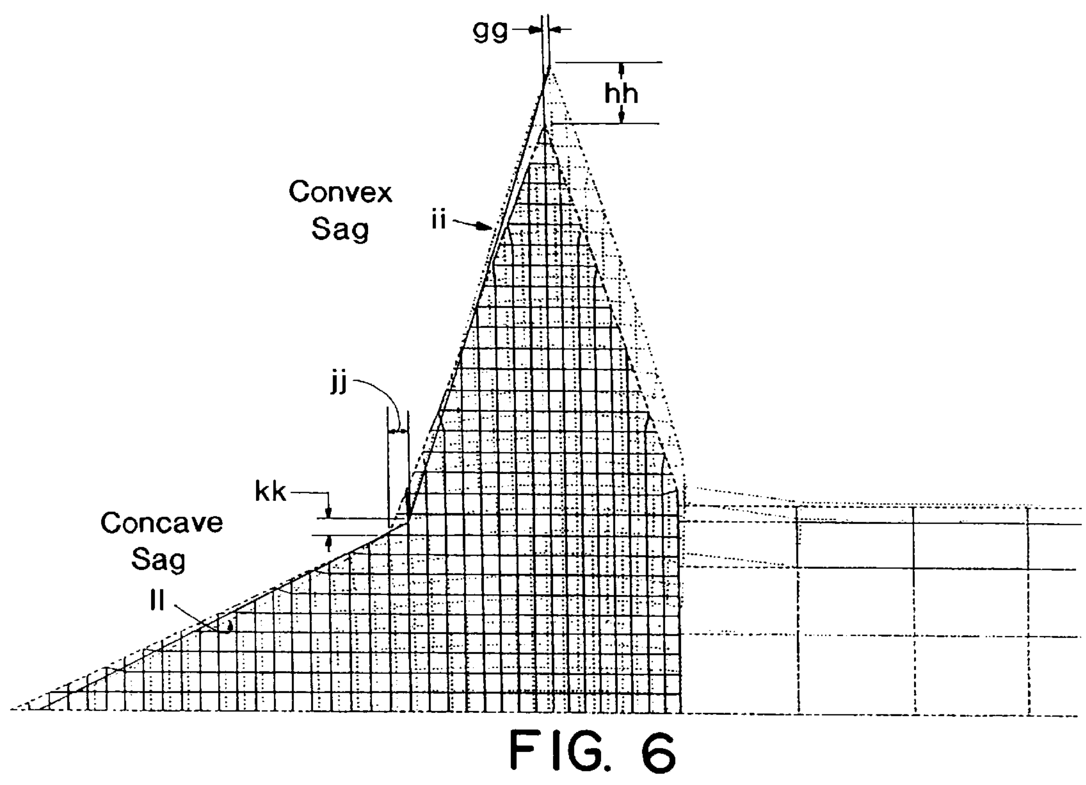

FIGS. 5 and 6 illustrate some concluding data from FEA of two scanners: one, unmodified (FIG. 5), and the other, stabilized (FIG. 6), following the procedure described above. The intersections of the cross-line patterns on both figures represent the points monitored in the analysis. The main body of the device is measured in 1 mm increments, and the shaft, in 6 mm intervals. Not apparent in these side views are the many points monitored between the two outside surfaces, which represent the nominally flat facets of the scanner. Because of symmetry, only the data above the axial plane is represented in each figure; the bottom portion being identical to the upper one is not shown. In an example of a finite element analysis hereof, computed dimensions represented in FIGS. 4 and 5 are as follows:

aa=18.4
bb=8.95
cc=4.4
dd=−0.99
ee=0.886
ff=−1.65
gg=−5.73
hh=5.76
ii=0.35
jj=−1.88
kk=1.44
ll=0.65

Numeric notations are in micro-inches (μ"), where 1μ" represents some 1/40th of a micrometer (μm) —an extremely small value. The deviation data is, thus, highly magnified. Data represented in these two figures is of an aluminum scanner, rotating at a shaft speed of 10,000 rpm. Data was also computed at 20,000 and at 30,000 rpm, where the numbers at 10,000 rpm are multiplied by the square of the speed ratio: 4× for 20,000 rpm and 9× for 30,000 rpm.

Observing the data provided by these two figures, the $M_2$ of the unmodified unit (FIG. 5) shows a concave sag (confirming the earlier heuristic description of the deformation process) of 4.4μ". The same facet in FIG. 6 shows a stabilized convex sag which is reduced to 0.35μ", while the mirror $M_1$ of the stabilized unit experiences an opposite concave sag of 0.65||". Since both mirrors serve in this double-reflection device, these small deformations balance even further, leaving a residual concave sag of 0.3μ". This ratio of 4.4/0.3 represents a 14.7×reduction in effective facet distortion. (This 14.7× ratio remains constant at varying shaft speeds, while the absolute sag multiplies according to $\omega^2$, per above.)

Considering the optical consequences of these deformations, one criterion frequently invoked is the fractional wavelength deviation from flatness. Analysis shows that at the familiar laser wavelength of 0.633 μm, the uncompensated aluminum scanner operating at 30,000 rpm experiences a 1.6-wave sag, while the compensated one develops a 0.11-wave sag. Further analysis shows that after compensation, a 6 mm diameter gaussian beam reflected from the two mirrors (of the aluminum scanner rotating at 30,000 rpm) will form a focal spot having the very slight astigmatic oblateness of less than 4%; typically inconsequential.

As has been described, a method is presented for reducing significantly the inertial deformation of facets of pyramidal optical scanners when under the stress of high speed rotation. It entails the establishment of complementary mass about a reference plane within the scanner substrate, of such distribution as to provide substantially symmetric rotary inertial symmetry about this reference plane. Symmetry is to be distributed in complementary positions about the reference plane; preferably such that the rotary inertia in a volume on one side of the plane does not differ from a corresponding volume on the other side by more than 20%; primarily in its outer radius region. A more measurable criterion for this condition is the approach toward geometric symmetry of the bounding surfaces about the reference plane; that is, the angle α (measured between the nominally flat facet and the reference plane) is balanced by the angle β (measured between the nominally flat complementary surface and the reference plane). When a substantive drive shaft or hub is used, its inertia contributes primarily to the inner-radius region of the facets and only moderately to the significant outer-radius region of the facets. Thus, substantial inertial balance is approached with complementary mass filling the outer-radius region, having a bounding surface of angle β which is typically less than angle α; that is, β <α. Numerically, for the variable conditions expressed above, the value of angle β resides preferably in the range of from (3/5)αto α; or, 0.6α<β <α. The nominal balance distribution can be determined effectively by application of finite element analysis (FEA), as demonstrated in the earlier section.

This complementary mass may join the shaft or hub in a smoothed curve rather than in the sharp transition illustrated in FIG. 3, without modifying the concept expressed above, for the angle $\beta$ in the important large-radius region is dominated by the nominally flat portion of its surface. Such curved contour may be deployed for purpose such as aerodynamic, mechanical or aesthetic value. When utilized for reasons other than for inertial balance, then the angle $\beta$ is typically much less than angle $\alpha$; that is $\beta<<\alpha$, and is not representative of the balancing process disclosed here. Numerically, it is distinguished from the above distortion-correcting cases by expressing $\beta$ to be less than $(\frac{1}{2})\alpha$; that is, $\beta<(\frac{1}{2})\alpha$.

Another typical variation to pyramidal scanner substrates is the use of a base of some thickness; providing a more massive scanner "head"; by effectively expanding the base material to the right of FIG. 1. It may terminate in a plane surface, or in one as described above. In this event, balancing is achieved by approaching the geometry depicted in FIGS. 2, 3 and 4; by effectively removing material from the upper portion (to form an apex) rather than by adding balancing mass axially beyond the already thick base.

Other variations include double-reflection devices, such as those first mentioned above, pyramidal scanners whose facets are displaced a significant distance radially from the rotating axis, and scanners having mechanical support on both sides of its substrate axis, in contrast to the one-sided "cantilever" suspensions exemplified above. This type is commonly identified as a "captured" system; typically having a bearings journal extending from the pyramidal apex side of the axis; the optical portion suspended thereby between bearings for added mechanical stability. Also may appear scanners having facets already curved, or of unequal angles, to render varying optical functions. In all these and related variations, the principles expressed here apply similarly for one skilled in the art to approach inertial balance for minimization of inertial deformation.

I claim:

1. An optical scanner having a rotational axis, comprised of a substrate with facets which are generally pyramidal, the outer diameter of said facets proximate to a base plane which is generally perpendicular to said axis, said scanner adapted to reduce the inertial deformation of said facets during high speed rotation of said scanner by shaping the substrate beyond said base plane such that during rotation, it is substantially inertially symmetric about said base plane.

2. An optical scanner as defined by claim 1, said base plane effectively terminating the larger diameter portion of the substrate, the smaller diameter portion of the substrate extending to a shaft or hub disposed generally concentric about said axis, the substrate beyond said base plane forming a contour which provides substantial geometric symmetry of the substrate about said base plane.

3. An optical scanner as defined by claim 2, wherein the smaller diameter shaft or hub tends to balance the lower inertial stress of the smaller diameter portion of the facets, while in the larger diameter portion of the scanner, where is imposed higher inertial stress, the mass of the substrate is extended axially beyond the base plane to form a contour which provides substantial inertial symmetry of the substrate about the base plane.

4. An optical scanner having a drive shaft or hub, as defined by claim 3, wherein the facet bounding the substrate forms an angle $\alpha$ with respect to the base plane and the complementary surface bounding the substrate forms an angle $\beta$ with respect to the base plane, said substrate adjusted such that the value of $\beta$ ranges between $0.6\alpha$ and $\alpha$, generating thereby a moderated inertial influence which augments the lower inertial influence of the drive shaft or hub, attaining thereby the substantial nulling of the inertial deformation of the facet during high speed rotation of the scanner.

5. An optical scanner having a drive shaft or hub, as defined by claim 2, wherein the facet bounding the substrate forms an angle $\alpha$ with respect to the base plane and the complementary surface bounding the substrate forms an angle $\beta$ with respect to the base plane, said substrate adjusted such that the value of $\beta$ ranges between $0.6\alpha$ and $\alpha$, generating thereby a moderated inertial influence which augments the lower inertial influence of the drive shaft or hub, attaining thereby the substantial nulling of the inertial deformation of the facet during high speed rotation of the scanner.

6. A method for stabilizing an optical scanner having a rotational axis and a substrate with facets which are generally pyramidal, the outer diameter of said facets being proximate to a base plane which is generally perpendicular to said axis, comprising: adapting said scanner to reduce the inertial deformation of said facets during high speed rotation of said scanner by shaping the substrate beyond said base plane such that during rotation it is substantially inertially symmetric about said base plane.

7. An optical scanner having a rotational axis, comprised of a substrate having facets which are generally pyramidal, the outer diameter of said facets proximate to a base plane which is generally perpendicular to said axis and effectively terminates the larger diameter portion of the substrate, which lower diameter portion extends to a shaft or hub disposed generally concentric about said axis, said scanner adapted to reduce the inertial deformation of said facets during high speed rotation by shaping the substrate beyond said base plane to form a contour which provides substantial inertial symmetry of the substrate about said base plane.

8. An optical scanner as defined by claim 7, wherein the smaller diameter shaft or hub tends to balance the lower inertial stress of the smaller diameter portion of the facets, while in the larger diameter portion of the scanner, where is imposed higher inertial stress, the mass of the substrate is extended axially beyond the base plane to form a contour which provides substantial inertial symmetry of the substrate about the base plane.

9. An optical scanner having a drive shaft or hub, as defined by claim 8, wherein the facet bounding the outer portion of the substrate forms an angle $\alpha$ with respect to the base plane and the complementary surface bounding the substrate forms an angle $\beta$ with respect to the base plane, said substrate adjusted such that the value of $\beta$ ranges between $0.6\alpha$ and $\alpha$, generating thereby a moderated inertial influence which augments the lower inertial influence of the drive shaft or hub, attaining thereby the substantial nulling of the inertial deformation of the facet during high speed rotation of the scanner.

10. An optical scanner having a drive shaft or hub, as defined by claim 7, wherein the facet bounding the outer portion of the substrate forms an angle $\alpha$ with respect to the base plane and the complementary surface bounding the substrate forms an angle $\beta$ with respect to the base plane, said substrate adjusted such that the value of $\beta$ ranges between $0.6\alpha$ and $\alpha$, generating thereby a moderated inertial influence which augments the lower inertial influence of the drive shaft or hub, attaining thereby the substantial nulling of the inertial deformation of the facet during high speed rotation of the scanner.

* * * * *